United States Patent [19]

Satake et al.

[11] Patent Number: 5,110,681

[45] Date of Patent: May 5, 1992

[54] MELT-STABLE POLY(ARYLENE THIOETHER-KETONE) PREPREGS AND MOLDED OR FORMED PRODUCTS THEREOF

[75] Inventors: Yoshikatsu Satake; Ken Kashiwadate; Yasuo Sakaguchi; Takayuki Katto; Zenya Shiiki, all of Iwaki, Japan

[73] Assignee: Kureha Kagaku Kogyo K. K., Tokyo, Japan

[21] Appl. No.: 261,073

[22] Filed: Oct. 21, 1988

[30] Foreign Application Priority Data

Oct. 30, 1987 [JP] Japan .................... 62-273524
Sep. 17, 1988 [JP] Japan .................... 63-231467

[51] Int. Cl.$^5$ .............. D03D 3/00; D03D 15/00; D03D 17/00; D03D 25/00
[52] U.S. Cl. .................... 428/419; 428/237; 428/240; 428/241; 428/265; 428/267; 428/272; 428/273; 428/283; 428/286; 428/290; 428/297; 428/302; 525/153; 528/226
[58] Field of Search .......... 528/226; 428/288, 244, 428/252; 525/153

[56] References Cited

U.S. PATENT DOCUMENTS

| | | |
|---|---|---|
| 4,590,104 | 5/1986 | Ziener et al. . |
| 4,690,972 | 9/1987 | Johnson et al. . |
| 4,698,415 | 10/1987 | Sinclair et al. . |
| 4,716,212 | 12/1987 | Gaughan . |
| 4,745,167 | 5/1988 | Iizuka et al. . |
| 4,772,679 | 3/1988 | Fukawa et al. ........... 528/226 |
| 4,792,481 | 12/1988 | O'Connor et al. ........... 428/288 |
| 4,814,224 | 3/1989 | Geibel et al. ........... 428/252 |
| 4,895,892 | 1/1990 | Satake et al. ........... 525/153 |

FOREIGN PATENT DOCUMENTS

| | | |
|---|---|---|
| 229495 | 7/1987 | European Pat. Off. . |
| 270955 | 6/1988 | European Pat. Off. . |
| 274754 | 7/1988 | European Pat. Off. . |
| 3405523 | 8/1985 | Fed. Rep. of Germany . |
| 3429670 | 2/1986 | Fed. Rep. of Germany . |
| 13347 | 7/1972 | Japan . |
| 58435 | 4/1985 | Japan . |
| 104126 | 6/1985 | Japan . |
| 14228 | 1/1986 | Japan . |
| 221229 | 10/1986 | Japan . |

OTHER PUBLICATIONS

Indian J. Chem., vol. 21A, May 1982, pp. 501–502.
*Indian Journal of Pure and Applied Physics*, vol. 22, Apr. 1984, pp. 247–248.
*Mol. Cryst. Liq. Cryst.*, vol. 83, 1982, pp. 229–238.

Primary Examiner—George F. Lesmes
Assistant Examiner—Richard Weisberger
Attorney, Agent, or Firm—Lowe, Price, Leblanc & Becker

[57] ABSTRACT

Disclosed herein is a melt-stable poly(arylene thioether-ketone) prepreg, which comprises in integral combination (A) 20–90 wt. % of a fibrous reinforcing material which comprises long fibers and/or at least one shaped long fiber body, said fibers and/or body being formed of inorganic fibers and/or organic fibers; and (B) 10–80 wt. % of a a thermoplastic matrix material composed principally of a melt-stable poly(arylene thioether-ketone) having predominant recurring units of the formula

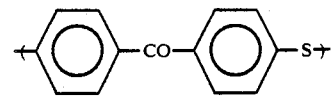

and having a melting point, Tm of 310°–380° C., a residual melt crystallization enthalpy, ΔHmc (420° C/10 min) of at least 10 J/g, a melt crystallization temperature, Tmc (420°C./10 min) of at least 210° C. and a reduced viscosity of 0.2–2 dl/g. A melt-stable molded or formed product can also be obtained by shaping the above prepreg or an arrangement or laminate of prepregs of the same type as the above prepreg at 140°–450° C. under stresses.

23 Claims, No Drawings

MELT-STABLE POLY(ARYLENE THIOETHER-KETONE) PREPREGS AND MOLDED OR FORMED PRODUCTS THEREOF

FIELD OF THE INVENTION

This invention relates to prepregs comprising a fibrous reinforcing material composed of inorganic or organic long fibers and/or at least one shaped body of inorganic or organic long fibers and a thermoplastic matrix material composed principally of a poly(arylene thioether-ketone) (hereinafter abbreviated as "PTK") having predominant recurring units of the formula

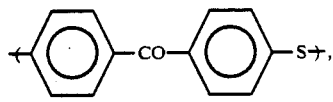

in which the —CO— and —S— are in the para position to each other, and in particular to prepregs comprising a thermoplastic matrix material composed principally of a melt-stable poly(arylene thioether-ketone) and long fibers and/or at least one shaped long fiber body.

This invention is also concerned with melt-stable molded or formed products obtained by shaping one or more of such prepregs under stresses and cooling the thus-shaped product and if necessary, then annealing the thus-shaped product at a temperature not higher than the melting point of the PTK.

BACKGROUND OF THE INVENTION

Various thermoplastic resins have recently been attracting more and more attention as matrix materials for composite materials reinforced with long fibers, because such thermoplastic resins have many advantages as matrix materials over thermosetting resins employed conventionally as principal matrix materials because of the realization of reuse of scraps and post processing, the elimination of the need for shelf-life control, substantially-shortened processing cycles, and improved moisture resistance.

With the recent advancement of weight-reducing technology in the fields of the aircraft, space, automobile, electrical and electronic, and other industries, development of composite materials reinforced with long fibers, ACM (Advanced Composite Materials), has been proceeded with rapidly. Conventionally, they primarily contained a thermosetting resin as a matrix material. There is however a growing demand for the development of matrix materials composed of a thermoplastic resin in order to meet desires for the possibility of reuse of scraps and post processing, the elimination of shelf-life control, the shortening of processing cycles and the improvement of moisture resistance. In the above-mentioned industrial fields in particular, there has been a particular demand for thermoplastic resins which as matrix materials, have heat resistance of about 300° C. or higher in terms of melting point and crystallinity facilitating melt forming or molding and processing.

As crystalline, heat-resistant, thermoplastic resins developed to date, there are, for example, poly(butylene terephthalate), polyacetal, poly(p-phenylene thioether), etc. These resins are however unable to meet the recent requirement level for heat resistance.

Polyether ether ketone (hereinafter abbreviated as "PEEK") and polyether ketone (hereinafter abbreviated as "PEK") have recently been developed as heat-resistant resins. These resins have a melting point of about 300° C. or higher and moreover, they are crystalline thermoplastic resins. It is possible to form or mold heat-resistant high-performance composite products from prepregs making use of such a resin as a matrix material.

PEEK and PEK however use expensive fluorine-substituted aromatic compounds as their raw materials. They hence involve such problems that they are costly and their use is limited for economical reasons.

Based on an assumption that PTK could be a promising candidate for heat-resistant thermoplastic resin like PEEK and PEK owing to their similarity in chemical structure, PTK has been studied to some extent to date.

There are some disclosure on PTKs, for example, in German Offenlegungsschrift 34 05 523A1 (hereinafter abbreviated as "Publication A"), Japanese Patent Laid-Open No. 58435/1985 (hereinafter abbreviated as "Publication B"), Japanese Patent Laid-Open No. 104126/1985 (hereinafter abbreviated as "Publication C"), Japanese Patent Laid-Open No. 13347/1972 (hereinafter abbreviated as "Publication D"), Indian J. Chem., 21A, 501–502 (May, 1982) (hereinafter abbreviated as "Publication E"), Japanese Patent Laid-Open No. 221229/1986 (hereinafter abbreviated as "Publication F"), and German Offenlegungsschrift 34 29 670A1 (hereinafter abbreviated as "Publication G").

It has however been difficult to provide a substantially defect-free, formed or molded product having a high density, high mechanical properties and high heat resistance, such as that required in the field of the aircraft industry, and the like, even if prepregs are formed using as a matrix material any one of the PTKs described in these publications. This is attributed to the fact that the PTKs developed so far have poor melt stability and undergo a crosslinking reaction, which is accompanied by a loss of crystallinity and an increase in melt viscosity, or foaming whereby they can hardly be filled thoroughly in a molten state into every corner of a fibrous reinforcing material.

Since the conventional PTKs are all insufficient in melt stability as described above, it has still been unable to obtain substantially defect-free, molded or formed products of high density, high mechanical properties and high heat resistance required in industrial fields such as the aircraft industry and space industry.

OBJECTS AND SUMMARY OF THE INVENTION

The present inventors have carried out an extensive investigation with a view toward developing a process for producing PTK suited for use as a matrix material in prepregs.

The present inventors attempted to conduct polymerization by using economical dichlorobenzophenone and/or dibromobenzophenone as a raw material in place of an expensive fluorine compound, increasing the water content in the polymerization system to a high level compared to processes reported previously, adding a polymerization aid and suitably controlling the profile of the polymerization temperature. As a result, high molecular-weight PTKs were obtained economically. The PTKs obtained by the above process were however still dissatisfactory in melt stability.

Thus, the present inventors made further improvements in the polymerization process. It has then been revealed that PTK, whose melt stability has been improved significantly, can be obtained by conducting polymerization without any polymerization aid while paying attention to the selection of a charge ratio of monomers, the shortening of the polymerization time at high temperatures, the selection of a material for a polymerization reactor and if necessary, by applying a stabilization treatment in a final stage of the polymerization.

It has also been found that the melt stability during melt processing can be improved further by adding a basic inorganic stabilizer such as the hydroxide or oxide of a Group I or II metal of the periodic table to the PTK(Japanese Patent Application No. 142772/1988).

It has then found that a substantially defect-free, molded or formed product of high density, high mechanical properties and high heat resistance can be obtained from one or more prepregs making use of the melt-stable PTK as a matrix material. The present invention has been brought to completion on the basis of these findings.

In one aspect of this invention, there is thus provided a melt-stable poly(arylene thioether-ketone) prepreg comprising in integral combination:

(A) 20 wt. %–90 wt. % of a fibrous reinforcing material which comprises long fibers and/or at least one shaped long fiber body, said fibers and/or body being formed of inorganic fibers and/or organic fibers;

(B) 10 wt. %–80 wt. % of a thermoplastic matrix material composed principally of a melt-stable poly(arylene thioether-ketone) having predominant recurring units of the formula

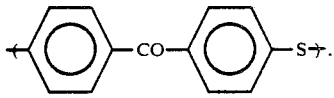

wherein the —CO— and —S— are in the para position to each other, and having the following physical properties (a)–(c):

(a) melting point, Tm being 310° C.–380° C.;

(b) melt crystallization temperature, Tmc (420° C./10 min) being at least 210° C. and residual melt crystallization enthalpy, ΔHmc (420° C./10 min) being at least 10 J/g, wherein Tmc (420° C./10 min) and ΔHmc (420° C./10 min) are determined by a differential scanning calorimeter at a cooling rate of 10° C./min after the poly(arylene thioether-ketone) is held at 50° C. for 5 minutes in an inert gas atmosphere, heated to 420° C. at a rate of 75° C./min and then held for 10 minutes at 420° C.; and (c) reduced viscosity being 0.2–2 dl/g as determined by viscosity measurement at 25° C. and a polymer concentration of 0.5 g/dl in 98 percent by weight sulfuric acid.

In another aspect of this invention, there is also provided a melt-stable molded or formed product obtained by shaping the above melt-stable poly(arylene thioether-ketone) prepreg or an arrangement or laminate of prepregs of the same sort at 140° C.–450° C. under stresses after preheating the prepreg or the arrangement or laminate at 140° C.–450° C. or without preheating the prepreg or the arrangement or laminate, cooling the thus-shaped product into the molded or formed product; or if necessary, reheating the thus-shaped product for 0.1–50 hours within a temperature range of from 140° C. to the melting point of the poly(arylene thioetherketone).

The prepreg according to this invention comprises the fibrous reinforcing material, which is composed of long fibers and/or at least one formed long fiber body, and the thermoplastic matrix material composed principally of the melt-stable PTK. The prepreg of this invention can therefore provide a molded or formed product which has a high density and is excellent in mechanical properties and heat resistance.

DETAILED DESCRIPTION OF THE INVENTION

Fibrous Reinforcing Material

The principal prepreg-reinforcing material useful in the practice of this invention is a fibrous reinforcing material composed of long fibers and/or at least one formed long-fiber body. As such reinforcing fibers, may be mentioned various inorganic fibers and organic fibers led by glass fibers, carbon (including graphite) fibers and Aramid fibers and including fibers of silica, alumina, silica-alumina, zirconia, silicon carbide, silicon nitride and the like. Of these, fibers of glass, carbon or Aramid are preferable from the standpoint of heat resistance, corrosion resistance, modulus of elasticity, strength, cost and the like.

Long fibers

Long fibers can be mentioned as one form of the fibrous reinforcing material used in this invention. Long fibers in various forms such as filaments, yarns, strands and rovings can be used. Basic unit filaments constituting long fibers in these forms may preferably be those having a filament diameter of 1–200 μm in general, preferably 3–50 μm and a length of at least ½ inch (12.7 mm), preferably at least 2 inches (50.8 mm). Those having a filament diameter smaller than 1 μm are difficult in production and are expensive. They are hence not preferred from the economical viewpoint. On the other hand, those having a filament diameter greater than 200 μm have a potential problem that they may not be able to exhibit sufficient reinforcing effects, so that they are not preferred either. Further, those having an extremely short length also have a potential problem that sufficient reinforcing effects may not be provided. They are hence not preferred.

Formed long-fiber body

Another form of the fibrous reinforcing material in this invention is a formed long-fiber body. As the formed long-fiber body, it is generally used in the form of cloth, tape, mat or paper. Basic unit filaments constituting such a formed long-fiber body preferably have a filament diameter of 1–200 μm in general, preferably 3–50 μm and a length of at least ½ inch, preferably at least 2 inches. Those having a filament diameter smaller than 1 μm are difficult in production and are expensive. They are hence not preferred from the economical viewpoint.

On the other hand, those having a filament diameter greater than 200 μm have a potential problem that they may not be able to exhibit sufficient reinforcing effects, so that they are not preferred either. Further, those having an extremely short length also have a potential problem that sufficient reinforcing effects may not be provided. They are hence not preferred.

These fibrous reinforcing materials may be used either singly or in combination.

Thermoplastic Matrix Material

The thermoplastic matrix material used as a prepreg matrix material in this invention is a melt-stable PTK, which hardly undergoes a crosslinking reaction or modification upon melt forming as will be described subsequently, or a thermoplastic material containing the melt-stable PTK as a principal component.

The prepreg matrix material useful in the practice of this invention may also contain, in addition to the melt-stable PTK, one or more other thermoplastic resins, short-fibrous fillers, inorganic fillers, etc. within a range not greater than 50 vol. %, preferably not greater than 40 vol. % of the matrix material and to an extent not impairing the melt stability, crystallinity and thermoplastic properties of the PTK.

As other thermoplastic resins usable in the present invention, may be mentioned by way of example resins such as poly(arylene thioethers), PEEKs, PEKs polyamides (including Aramids), polyamideimides, polyesters (including aromatic polyesters and liquid crystalline polyesters), polysulfones, polyether sulfones, polyether imides, polyarylenes, poly(phenylene ethers), polycarbonates, polyester carbonates, fluoropolymers, polyolefins, polystyrenes, polymethyl methacrylate, and ABS; as well as elastomers such as fluororubbers, silicone rubbers, olefin rubbers, acrylic rubbers, polyisobutylenes (including butyl rubber), hydrogenated SBR, polyamide elastomers and polyester elastomers.

As short-fibrous fillers usable in this invention, may be mentioned short fibers such as glass fibers, carbon fibers (including graphite fibers), silica fibers, alumina fibers, zirconia fibers, silicon carbide fibers and Aramid fibers; as well as whiskers such as potassium titanate whiskers, calcium silicate (including wollastonite) whiskers, calcium sulfate whiskers, carbon whiskers, silicon nitride whiskers and boron whiskers.

As exemplary inorganic fillers usable in this invention, may be mentioned talc, mica, kaolin, clay, silica, alumina, silica-alumina, titanium oxide, iron oxides, chromium oxide, calcium carbonate, calcium silicate, calcium phosphate, calcium sulfate, magnesium carbonate, magnesium phosphate, barium sulfate, silicon, carbon (including carbon black), graphite, silicon nitride, molybdenum disulfide, glass, hydrotalcite, ferrite, etc., all, in a powder form.

In addition to these thermoplastic resins and fillers, the prepreg matrix material useful in the practice of this invention may also be added with additives such as stabilizers, corrosion preventives, lubricants, surface-roughening agents, nucleating agents, mold releasing agents, colorants, coupling agents, flashing preventives and/or antistatic agents. The hydroxides, oxides, carbonates, borates, phosphates and the like of Group I and Group II metals are effective as stabilizers. Of these, the hydroxides and oxides of Group IIA metals are particularly effective.

Poly(arylene thioether-ketone)

The melt-stable PTK, which is the matrix material of the prepreg according to this invention or a principal component of the matrix material, is poly(arylene thioether-ketone) (PTK) having predominant recurring units of the formula

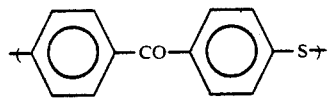

wherein the —CO— and —S— groups are in the para position to each other. In order to be heat-resistant polymers comparable with PEEK and PEK, the PTK in this invention may preferably contain the above recurring units in a proportion of 50 wt. % or higher, more preferably, of 60 wt. % or higher, most preferably, of 70 wt. % or higher. If the proportion of the recurring units is less than 50 wt. %, there is a potential problem that the crystallinity of the polymer is reduced and its heat resistance is lowered correspondingly.

Exemplary recurring units other than the above recurring units may include:

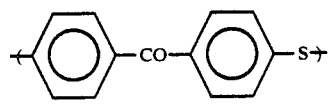

(except for the recurring unit in which —CO— and —S— are in the para position to each other.);

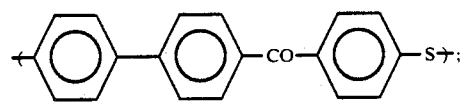

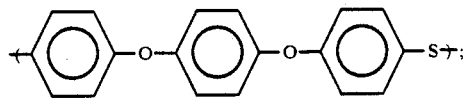

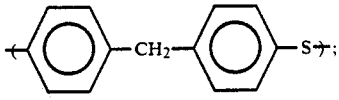

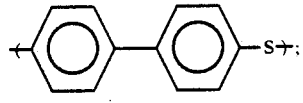

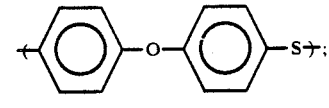

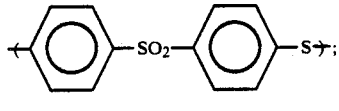

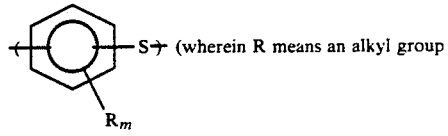 (wherein R means an alkyl group having 5 or less carbon atoms and m stands for an integer of 0-4.).

It is desirable that the melt-stable PTK employed as a matrix material in the prepreg of this invention is an uncured polymer, especially, an uncured linear polymer.

The term "cure" as used herein means a molecular-weight increasing treatment by a method other than a usual polycondensation reaction, for example, by a crosslinking, branching or molecular-chain extending reaction, particularly, a molecular-weight increasing treatment by a high-temperature heat treatment or the like. The term "uncured polymer" as used herein means a polymer which has not been subjected to a post treatment in which the molecular weight of the polymer is rendered greater by curing to increase its melt viscosity. In general, "curing" causes PTK to lose or decrease its flowability and crystallinity. Cured PTK can hardly be filled in a molten state thoroughly into spaces among reinforcing fibers. Even if a molded or formed product is obtained, the product tends to have a low density, many defects, reduced crystallinity and inferior mechanical properties. Curing is hence not preferred.

However, PTKs having a partially crosslinked and/or branched structure to such an extent not impairing its flowability and crystallinity are also allowed as prepreg matrix materials according to the present invention. For example, PTK obtained by polymerization in the presence of a small amount of at least one of crosslinking agents (e.g., polychlorobenzophenone, polybromobenzophenone and the like) and PTK subjected to mild curing are acceptable as PTKs useful in prepreg matrix materials for this invention.

Physical properties of PTK

PTKs useful as prepreg matrix materials in this invention preferably have the following physical properties.

(a) As an index of the characteristics of a heat-resistant matrix, its melting point, Tm ranges from 310° C. to 380° C.

(b) As an index of the characteristics of the melt stability of the polymer in a molten state, its melt crystallization temperature, Tmc (420° C./10 min) is at least 210° C. and its residual melt crystallization enthalpy, ΔHmc (420° C./10 min) is at least 10 J/g.

(c) As an index of the characteristics of melt stability of the polymer in its molten state as in the preceding paragraph (b), the melt viscosity increment in terms of times, $\eta^*(385°$ C./30 min)/$\eta^*(385°$ C./5 min) is 10 or smaller.

(d) As an index of the characteristics of a crystalline polymer, the density of the polymer obtained in a crystallized form by annealing it at 80° C. for 30 minutes is at least 1.34 g/cm$^3$ at 25° C.

(e) As an index of the characteristics of a PTK capable of providing a molded or formed product which contains the polymer filled in a molten state thoroughly into spaces of each fibrous reinforcing material and which has sufficient mechanical strength, its reduced viscosity, $\eta_{red}$ is within the range of 0.2-2 dl/g.

Next, the physical properties of the PTK useful in the practice of this invention will be described.

(1) Heat resistance

The melting point, Tm of a polymer serves as an index of the heat resistance of the polymer.

The PTK employed as the prepreg matrix material in the present invention has a melting point, Tm of 310° C.-380° C., preferably 320° C.-375° C., more preferably 330° C.-370° C. Those having a melting point, Tm lower than 310° C. are insufficient in heat resistance as heat-resistant resins comparable with PEEK and the like. On the other hand, it is difficult to perform melt processing of those having a melting point, Tm higher than 380° C. without decomposition. Such an excessively low or high melting point is undesired.

(2) Melt stability

The greatest feature of the PTK employed as the matrix material in the prepreg of the present invention resides in that it has melt stability sufficient to permit its smooth and thorough filling into spaces in each fibrous reinforcing material.

All the conventional PTKs have low melt stability and upon their melt processing, tend to undergo a crosslinking reaction accompanied by a reduction in flowability, loss of crystallinity and increase in melt viscosity.

It is hence possible to obtain an index of the melt stability of PTK upon its melt processing by investigating the residual crystallinity and melt viscosity increment, in terms of times, of PTK after holding it at an elevated temperature of its melt processing temperature or higher for a predetermined period of time.

The residual crystallinity can be evaluated quantitatively by measuring the melt crystallization enthalpy with a differential scanning calorimeter (hereinafter abbreviated as "DSC"). Specifically, the melt crystallization temperature, Tmc (420° C./10 min) and the residual melt crystallization enthalpy, ΔHmc (420° C./10 min) of the PTK as determined at a cooling rate of 10° C./min after the PTK is held at 50° C. for 5 minutes in an inert gas atmosphere, heated to 420° C. at a rate of 75° C./min, and then held for 10 minutes at 420° C. (higher than the melt processing temperature), can be used as measures of its heat resistance and melt stability.

The melt-stable PTK useful as the matrix material of the prepreg according to the present invention is a polymer whose melt crystallization temperature, Tmc (420° C./10 min) is preferably at least 210° C., more preferably at least 220° C., most preferably at least 230° C. and whose residual melt crystallization enthalpy, ΔHmc (420° C./10 min) is preferably at least 10 J/g, more preferably at least 15 J/g, most preferably at least 20 J/g.

A PTK, whose Tmc (420° C./10 min) is lower than 210° C. and whose ΔHmc (420° C./10 min) is smaller than 10 J/g, tends to lose its crystallinity or to induce a melt viscosity increase upon its melt processing, so that difficulties are encountered for the production of a substantially defect-free molded or formed product having high crystallinity, high mechanical strength and high heat resistance. Most of the conventionally-known PTKs are such polymers.

The melt viscosity increment in terms of times is measured, for example, by maintaining the PTK at 385° C. (an elevated temperature higher than its melting point) for varied periods of time and calculating the increment between its melt viscosities for the varied heating periods. It can therefore be used as an index of the melt stability of the PTK. As a PTK employed as a matrix material for the prepreg according to this invention, the melt viscosity increment in terms of times $\eta^*(385°$ C./30 min)/$\eta^*(385°$ C./5 min) may be 10 or smaller, preferably 5 or smaller, more preferably 3 or smaller. Here, $\eta^*(385°$ C./30 min) and $\eta^*(385°$ C./5 min) mean the melt viscosities of the PTK as measured at 385° C. and a shear rate of 1200/sec after preheating it at 385° C. for 30 minutes and 5 minutes respectively. A PTK matrix material having a melt viscosity increment greater than 10 times undergoes an unduly large viscosity increment. It is thus difficult to have the PTK matrix material penetrated in a molten state thoroughly into every corner of a fibrous reinforcing material, so that a substantially defect-free, formed or molded product having a high density, high mechanical properties and high heat resistance can be provided hardly. Almost all conventional PTKs are such PTKs.

(3) Crystallinity

As an index of the crystallinity of a polymer, its density is used.

The PTK used as the matrix material in the prepreg of the present invention is desirably a polymer whose density (at 25° C.) is preferably at least 1.34 g/cm$^3$, more preferably at least 1.35 g/cm$^3$ when measured in a form crystallized by annealing it at 280° C. for 30 minutes. Those having a density lower than 1.34 g/cm$^3$ have potential problems that they may have low crystallinity and hence insufficient heat resistance. There are additional potential problems such that resulting molded or formed products have a low density, contain many defects and also show insufficient mechanical properties.

In particular, PTK crosslinked to a high degree (e.g., the PTK described in Publication B) has lost its crystallinity to a marked extent and its density is generally far lower than 1.34 g/cm$^3$.

(4) Molecular weight:

The solution viscosity, for example, reduced viscosity, $\eta_{red}$ of a polymer can be used as an index of its molecular weight.

In order to have a polymer filled in a molten state thoroughly into all corners of spaces in a fibrous reinforcing material, any unduly high melt viscosity is not preferred for the polymer. On the other hand, a polymer having a higher molecular weight is preferred in order to impart sufficiently high mechanical strength to a molded or formed product to be obtained. Accordingly, PTK's molecular weight which is correlated directly to its melt viscosity is one of important factors.

As a PTK to be used as a matrix material in a prepreg according to this invention, it may desirably be a high molecular-weight PTK whose reduced viscosity, $\eta_{red}$ is preferably 0.2–2 dl/g, more preferably 0.3–2 dl/g, most preferably 0.5–2 dl/g. Incidentally, reduced viscosity, $\eta_{red}$ as used herein is indicated by a value as determined by viscosity measurement at 25° C. and a polymer concentration of 0.5 g/dl in 98 percent by weight sulfuric acid. Since a PTK whose $\eta_{red}$ is lower than 0.2 dl/g has a low melt viscosity and high tendency of giving molded or formed products having insufficient mechanical strength, such a PTK is not preferred. On the other hand, a PTK whose $\eta_{red}$ exceeds 2 dl/g is not preferred either since difficulties are encountered in filling it thoroughly into spaces in a fibrous reinforcing material.

Production process of PTK

The melt-stable PTK used as a matrix material in the present invention can be produced, for example, by subjecting an alkali metal sulfide and a dihalogenated aromatic compound, preferably, dichlorobenzophenone and/or dibromobenzophenone to polymerization, for a short period of time, in the substantial absence of a polymerization aid (a salt of a carboxylic acid, or the like), in an aprotic polar organic solvent, preferably, an organic amide solvent (including a carbamic amide or the like) and in a system having a water content far higher compared with polymerization processes of the prior art while controlling the temperature profile suitably, and if necessary, by choosing the material of a reactor suitably.

Namely, the melt-stable PTK useful in the practice of the present invention can be produced suitably by causing an alkali metal sulfide and a dihalogenated aromatic compound consisting principally of dichlorobenzophenone and/or dibromobenzophenone to undergo a dehalogenation or sulfuration reaction under following conditions (a)–(c) in an organic amide solvent.

(a) the ratio of the water content to the amount of the charged organic amide solvent being 2.5–15 (mole/kg);

(b) the ratio of the amount of the charged dihalogenated aromatic compound to the amount of the charged alkali metal sulfide being 0.95–1.2 (mole/mole); and (c) the reaction temperature being 60° C.–300° C. with a proviso that the reaction time at 210° C. and higher is within 10 hours.

The melt-stable PTK can be obtained more suitably when a reactor at least a portion of which, said portion being brought into contact with the reaction mixture, is made of a corrosion-resistant material such as titanium material.

If desired, the dihalogenated aromatic compound may be charged in an excess amount relative to the alkali metal sulfide, preferably, a portion of the dihalogenated aromatic compound is charged and polymerized in a final stage, or at least one halogen-substituted aromatic compound having at least one substituent group having electron-withdrawing property at least equal to —CO— group (preferably, 4,4'-dichlorobenzophenone and/or 4,4'-dibromobenzophenone employed as a monomer) may be added and reacted (as a stabilization treatment in a final stage of the polymerization), whereby a PTK improved still further in melt stability can be obtained.

Structure of Prepregs

Prepregs according to this invention, each of which can provide a molded or formed product having excellent mechanical properties and heat resistance, are produced by integrally combining 20 wt. %–90 wt. %, preferably 25 wt. %–85 wt. %, more preferably 30 wt. %–80 wt. % of the aforementioned fibrous reinforcing material composed of long fibers and/or at least one formed long-fiber body with the remainder of the above-described thermoplastic matrix material comprising the melt-stable PTK also mentioned above.

If the proportion of the fibrous reinforcing material is less than 20 wt. %, there is a potential problem that its effects as a reinforcing material cannot be exhibited sufficiently. If its proportion exceeds 90 wt. % on the contrary, it would be difficult to firmly bond the fibrous reinforcing material with the matrix material.

Production of Prepreg

Each melt-stable PTK prepreg of this invention can be produced by integrally combining the above-mentioned fibrous reinforcing material with the thermoplastic matrix material composed principally of the melt-stable PTK, for example, by the powder impregnation method, melt coating method, film fusion-bonding method, doubling (mix spinning)-mix weaving method, or the like.

From the viewpoint of flexibility upon processing into a molded or formed product, the prepreg may preferably in the form of a sheet, tape, cloth, cord or the like.

Powder impregnation method

The prepreg of this invention can be produced by integrally combining the powdery thermoplastic matrix material with the fibrous reinforcing material, for example, in accordance with any one of the following methods.

(1) The thermoplastic matrix material in the form of powder having an average particle size of 0.1-100 μm, more preferably 1-50 μm, which is composed principally of the melt-stable PTK, is directly spread over the fibrous reinforcing material, so that the fibrous reinforcing material is impregnated with the matrix material.

(2) A slurry is formed by dispersing the powder, preferably at a concentration of 1-50 vol. %, more preferably at a concentration of 5-40 vol. %, preferably in a liquid medium formed of an aqueous and/or organic solvent, more preferably in an aqueous medium containing a surfactant and a protective colloid agent. The slurry is then spread over the fibrous reinforcing material or the fibrous reinforcing material is immersed in the slurry, whereby the fibrous reinforcing material is impregnated with the matrix material.

(3) If necessary, the fibrous reinforcing material impregnated with the powdery matrix material is heated at a temperature in the range of from the melting point of the PTK to 450° C. so as to have the matrix material fusion-bonded to the fibrous reinforcing material.

In the method (2), an aqueous medium is more preferred from the viewpoint of easy workability, safety, prevention of pollution, economy, etc.

When long fibers are used, a prepreg may be produced by causing the fibers to orient in one or more directions. When formed long-fiber bodies are used on the other hand, plural sheets of the bodies may be laminated into a prepreg.

Melt coating method

The prepreg according to this invention can be preferably produced, for example, (i) by bringing a melt of the thermoplastic matrix material, which is composed principally of the melt-stable PTK, and the fibrous reinforcing material into mutual contact within a die (closs die) or a melt bath, (ii) by bringing the fibrous reinforcing material into contact with a melt of the matrix material within an extruder while feeding the fibrous reinforcing material through a vent of the extruder, or (iii) coating the fibrous reinforcing material with a melt of the matrix material.

When long fibers are used, a prepreg with the long fibers oriented in one direction can be produced more easily.

Film fusion-bonding method

The prepreg according to this invention can also be produced by laminating the fibrous reinforcing material with a film formed of the thermoplastic matrix material, which is composed principally of the meltstable PTK, and having a thickness of 1-200 μm, more preferably 2-100 μm and then heating the resultant laminate to a temperature in the range of from the melting point of the PTK to 450° C. so as to have the film fusion-bonded to the fibrous reinforcing material.

When long fibers are used, a prepreg may be produced by causing the fibers to orient in one or more directions.

Doubling (mix spinning)-mix weaving method

The prepreg according to this invention can also be produced by using as the fibrous reinforcing material long fibers having a length of 5 inches (127 mm) or longer, preferably 10 inches (254 mm) or longer and doubling (mix-spinning) and/or mix-weaving the long fibers with long fibers made of the thermoplastic matrix material, which is in turn composed principally of the melt-stable PTK, and have a filament diameter of 1-200 μm, preferably 2-100 μm, and if necessary, then heating the resultant product to a temperature of from the melting point of the PTK to 450° C. so as to have the thermoplastic matrix material fusion-bonded to the fibrous reinforcing material.

Molded or formed product and its production

The molded or formed product with the high-crystallinity, melt-stable and high-density matrix can be obtained by optionally preheating the melt-stable PTK prepreg or an arrangement or laminate of such melt-stable PTK prepregs to a temperature of 140° C.-450° C., shaping the prepreg or the arrangement or laminate at 140° C.-450° C. while applying stresses, for example, by calendering, vacuum forming, embossing or pultrusion, and then cooling the thus-shaped product into the final molded or formed product, and if necessary, then reheating (annealing) the thus-shaped product for 0.1-50 hours within a temperature range of from 140° C. to the melting point of the PTK.

Since the PTK on the matrix layer is melt-stable and highly crystalline, molded or formed high-density matrix products having few defects, high mechanical strength, high stiffness and high heat resistance can be obtained with ease. Especially, molded or formed high-density matrix products, in each of which crystallization has been increased by cooling or reheating until the density of the PTK portion of the matrix layer reaches at least 1.34 g/cm$^3$ as measured at 25° C., have been improved especially in mechanical strength, stiffness, heat resistance, etc.

The greatest merit of the prepreg according to this invention resides in that since it employs as its matrix material the thermoplastic material composed principally of the melt-stable PTK, a molded or formed product having high heat resistance and mechanical properties can be easily obtained by simply shaping the prepreg under stresses and if necessary, annealing the thus-shaped product at a temperature of the melting point of the PTK or lower. Accordingly, it is unnecessary to treat the molded or formed final product at an elevated temperature above the melting point of the PTK to crosslink the PTK unlike Publication A.

Application Fields

High-density and melt-stable molded or formed products produced from melt-stable PTK prepregs according to this invention are usable in a wide variety of fields, for example, as structural members of aircrafts, rockets, automobiles and the like (exterior trims, interior trims, steering baffles, propeller blades, injection nozzles, doors, seats, etc.), automobile engines and their peripheral parts, housings for electric and electronic appliances, heat-resistant/corrosion-resistant pipes, cookware for electronic ranges, and the like.

ADVANTAGES OF THE INVENTION

Melt-stable PTK prepregs according to this invention can easily provide molded or formed products having few defects and high density, strength, elasticity and heat resistance by shaping them under stresses and optionally, annealing the thus-shaped products at a temperature of the melting point of the PTK or lower.

EMBODIMENTS OF THE INVENTION

The present invention will hereinafter be described more specifically by the following Experiments and Examples. It should however be borne in mind that the present invention is not limited to the following Experiments and Examples only.

EXPERIMENTS

Synthesis Experiment 1: (Synthesis of Melt-Stable PTK)

A titanium-lined reactor was charged with 90 moles of 4,4'-dichlorobenzophenone (hereinafter abbreviated as "DCBP"; product of Ihara Chemical Industry Co., Ltd.), 90 moles of hydrated sodium sulfide (water content: 54.0 wt. %; product of Sankyo Kasei Co., Ltd.) and 90 kg of N-methylpyrrolidone (hereinafter abbreviated as "NMP") (water content/NMP=5.0 moles/kg). After the reactor being purged with nitrogen gas, the resultant mixture was heated from room temperature to 240° C. over 1.5 hours and then maintained at 240° C. for 0.9 hours. In order to apply the stabilization treatment in the final stage of the polymerization, the reaction mixture was heated to 260° C. over 0.5 hour while charging under pressure a mixture composed of 5.0 moles of DCBP, 20 kg of NMP and 100 moles of water. The resultant mixture was maintained further at 260° C. for 1.0 hour to react them.

The reactor was cooled, and the reaction mixture in the form of a slurry was taken out of the reactor and was then poured into about 200 l of acetone. The resultant polymer was precipitated. The polymer was recovered by filtration, and then washed three times with acetone and additionally three times with water. Acetone and water were removed to obtain the polymer in a wet form. The wet polymer was dried at 70° C. for 12 hours under reduced pressure, thereby obtaining Polymer 1 as an ivory powder.

Synthesis Experiment 2: (Synthesis of Melt-Stable PTK)

Polymerization was conducted in the same manner as in Synthesis Experiment 1 except that the reaction time at 240° C. was changed to 1.1 hours. The reaction mixture in the form of a slurry was then processed in the same manner as in Synthesis Experiment 1, whereby Polymer 2 was obtained as an ivory powder.

Synthesis Experiment 3: (Synthesis of Melt-Stable PTK)

Polymerization was conducted in the same manner as in Synthesis Experiment 1 except that the reaction time at 240° C. was changed to 1.4 hours. The reaction mixture in the form of a slurry was then processed in the same manner as in Synthesis Experiment 1, whereby Polymer 3 was obtained as an ivory powder.

Synthesis Experiment 4: (Synthesis of Conventional PTK)

A reactor made of SUS 316 was charged with 1.0 mole of sodium sulfide trihydrate, 800 ml of NMP and 1.0 g of sodium hydroxide. The resulting mixture was heated up to 210° C., whereby 42 g of distilled water containing 3 g of NMP was obtained. The residue was the cooled to about 45° C. Under vigorous stirring, 1.0 mole of 4,4'-difluorobenzophenone and 0.033 mole of sodium sulfite were added (water content/NMP=0.9 mole/kg). The reaction system was pressurized to 5 atm with nitrogen gas, and the contents were maintained at 250° C. for 4 hours to polymerize them. After the reaction, the reactor was cooled to 100° C., and the reaction mixture in the form of a slurry was taken out. The resulting polymer was separated and then washed with hot water and acetone separately and repeatedly. After sufficient washing of the polymer, it was dried to obtain Polymer A as a yellowish brown powder.

Synthesis Experiment 5: (Synthesis of Conventional PTK)

A reactor made of SUS 316 was charged with 10 moles of sodium sulfide nonahydrate, 5.0 l of NMP and 10 moles of lithium acetate. The resultant mixture was heated up to 200° C. under a nitrogen gas stream to remove water therefrom, whereby 1580 g of distilled aqueous solution containing 104 g of NMP was obtained. After cooling the reaction system to 120° C., a solution formed of 10 moles of DCBP and 0.8 l of NMP was charged (water content/NMP=1.4 moles/kg). The thus-obtained mixture was maintained, under stirring and nitrogen gas pressure, at 230° C. for 2 hours and then at 250° C. for 1 hour so as to polymerize them. After the polymerization reaction, the reaction mixture in the form of a slurry was poured into water. A polymer thus precipitated was washed with water and acetone separately and repeatedly, and was then dried to obtain Polymer B as a brown powder.

A portion of Polymer B was heated at 250° C. for two hours in air, thereby obtaining Polymer BX in the form of a cured black powder.

Incidentally, Polymers A, B and BX were prepared by following the processes disclosed in Publications A, B and B respectively. They were provided as exemplary PTKs according to the prior art.

MEASUREMENT OF MELTING POINTS

With respect to each of the PTK thus obtained, the melting point, Tm was measured as an index of its heat resistance. The measurement was performed in the following manner. About 10 mg of each PTK (powder) was weighed. Using a DSC (Model TC 10A; manufactured by Metler Company), the sample was held at 50° C. for 5 minutes in an inert gas atmosphere, and was then heated up at a rate of 10° C./min so as to measure its melting point. Results are collectively shown in Table 1.

Measurements of melt crystallization temperature and residual melt crystallization enthalpies With respect to each of the PTKs obtained in the Synthesis Examples, the melt crystallization peak temperature, Tmc (420° C./10 min) and residual melt crystallization enthalpy, ΔHmc (420° C./10 min) were measured.

Namely, the temperature corresponding to a peak of melt crystallization measured by the DSC is represented by Tmc (420° C./10 min) and the amount of heat converted from the area of the peak was taken as residual melt crystallization enthalpy, ΔHmc (420° C./10 min).

Described specifically, about 10 mg of each PTK (powder) was weighed. After holding the PTK at 50° C. for 5 minutes in an inert gas atmosphere, it was heated at a rate of 75° C./min up to 420° C. and held at that temperature for 10 minutes. While cooling the PTK at a rate of 10° C./min, its Tmc (420° C./10 min) and ΔHmc (420° C./10 min) were measured.

Results are collectively shown in Table 1.

Measurement of melt viscosity increment in terms of times

In order to investigate the melt viscosity increment (in terms of times) of each of the PTKs obtained respectively in Synthesis Experiments, a sample of the PTK was loaded on "Capillograph" (manufactured by Toyo Seiki Seisakusho, Ltd.) equipped with a nozzle having an internal diameter of 1 mm and an length-to-diameter ratio of 10/1 (L/D =10/1). The polymer sample was preheated at 385° C. for 5 minutes and then 385° C. for 30 minutes and its melt viscosity $\eta^*$ was measured at 385° C. and a shear rate of 1200/sec. The increment (in terms of times) of the viscosity $\eta^*$ (385° C./30 min) to the viscosity $\eta^*$ (385° C./5 min) was then determined. Results are shown collectively in Table 1.

It was found from Table 1 that Polymer 1, Polymer 2 and Polymer 3 which were melt-stable PTKs had large Tmc and ΔHmc, were stable and retained crystallinity sufficiently even when held at 420° C. for 10 minutes, whereas Polymers A, B and BX which were prior art PTKs were lowered in Tmc and ΔHmc and lost crystallinity when held at 420° C. for 10 minutes. It was also found that Polymer 1, Polymer 2 and Polymer 3 remained stable and showed only a small increment in melt viscosity even when held at 385° C. for 30 minutes whereas Polymers A, B and BX according to the prior art underwent a crosslinking reaction, were increased in viscosity and substantially lost flowability.

TABLE 1

| Polymer code | 1 | 2 | 3 | A | B | BX |
|---|---|---|---|---|---|---|
| Heat resistance Tm (°C.) | 360 | 357 | 356 | 365 | 335 | 331 |
| Melt stability | | | | | | |
| ΔHmc (420° C./10 min) (J/g) | 59 | 55 | 53 | 0 | 0 | 0 |
| Tmc (420° C./10 min) (°C.) | 306 | 300 | 298 | ND[1] | ND[1] | ND[1] |
| $\eta^*$(385° C./30 min)/$\eta^*$(385° C./5 min) | <2 | <2 | <2 | >>10[2] | >>10[2] | >>10[2] |
| Remarks | Ex. | Ex. | Ex. | Conventional PTK Comp. Ex. | Conventional PTK Comp. Ex. | Conventional PTK, cured Comp. Ex. |

[1]ND: Not detected.
[2]Flowability was lost almost entirely when preheated for 30 minutes.

Measurements of densities and solution viscosities

With respect to the individual PTKs obtained in Synthesis Experiments, their densities were measured as indices of their crystallinity. Namely, each PTK (powder) was first of all placed between two sheets of polyimide film ("Kapton", trade mark; product of E. I. du Pont de Nemours & Co., Inc.). It was preheated at 385° C. for 2 minutes and then press-formed at 385° C. for 0.5 minute by a hot press. It was then quenched to obtain an amorphous sheet whose thickness was about 0.15 mm. A part of the amorphous sheet was used directly as a sample, while the remaining part was annealed at 280° C. for 30 minutes to use it as an annealed sample with an increased degree of crystallization. Their densities were measured at 25° C. by means of a density gradient tube (lithium bromide/water).

Results are given collectively in Table 2.

As to the melt-stable PTKs, their solution viscosities (reduced viscosities, $\eta_{red}$) were measured respectively as indices of their molecular weights.

Namely, each PTK sample was dissolved in 98 wt. % sulfuric acid to give a polymer concentration of 0.5 g/dl. The reduced viscosity of the resultant solution was then measured at 25° C. by means of a Ubbellohde viscometer.

The reduced viscosities, $\eta$red of Polymer 1, Polymer 2 and Polymer 3 were 0.41, 0.53 and 0.73 respectively.

It was found from Table 2 that Polymer 1, Polymer 2 and Polymer 3 which were melt-stable PTKs had high density and high crystallinity and the densities of their annealed products reached 1.34 g/cm³ while Polymers A, B and BX which were conventional PTKs underwent a crosslinking reaction accompanied by localized foaming upon melt-forming of sample sheets and provided low-density and low-crystallinity sheets. Especially, the sheet obtained from Polymer BX in the cured form had low density and crystallinity.

TABLE 2

| Polymer code | 1 | 2 | 3 | A | B | BX |
|---|---|---|---|---|---|---|
| Density (25° C.) | | | | | | |
| Amorphous sheet (g/cm³) | 1.30 | 1.30 | 1.30 | 1.29[1] | 1.27[1] | 1.27[1] |
| Annealed sheet (g/cm³) | 1.35 | 1.35 | 1.35 | 1.31[1] | 1.30[1] | 1.30[1] |
| Remarks | Ex. | Ex. | Ex. | Conventional PTK Comp. Ex. | Conventional PTK Comp. Ex. | Conventional PTK, cured Comp. Ex. |

[1]A crosslinking reaction accompanied by localized foaming was observed upon melt-forming of the sample sheet, and the density varied locally.

EXAMPLE 1

Polymers 1, 2, 3, A, B and BX were individually added with 0.5 wt. % of fine calcium hydroxide powder and then comminuted to an average particle size of 20 μm in a mill. Fine polymer powders thus obtained were separately dispersed in an aqueous medium containing 0.4 wt. % of polyvinyl alcohol to give a concentration of about 10 vol. %, thereby preparing slurries of the respective polymers.

The slurries were separately spread over a glass cloth "#WF150-100BV" (trade name; product of NITTO BOSEKI CO., LTD.; 144 g/m$^2$; 18 weft yarns/25 mm; 18 warp yarns/25 mm). Water as the solvent was caused to evaporate off, so that the cloth was impregnated with the polymer. Impregnation was repeated until the polymer content reached about 60 wt. %.

The resultant polymer-impregnated prepregs were individually placed between frame plates. Using a hot press, they were separately preheated at 390° C. for 1 minute and then pressed at 390° C. for 2 minutes under about 300 kg/cm$^2$ so that sheet-like prepregs of about 0.22 mm thick were produced correspondingly Sheet-like prepregs were also produced in exactly the same manner by using, instead of Polymer 1, a blend polymer composed of 90 wt. % of Polymer 1 and 10 wt. % of "FORTRON #W214" [trade name; product of Kureha Chemical Industry Co., Ltd.; linear poly(p-phenylene thioether)] and another blend polymer composed of 65 wt. % of Polymer 2 and 35 wt. % of "FORTRON #W214" separately.

The prepreg sheets obtained from each polymer were laminated in pairs and then placed between frame plates. They were separately preheated on a hot press at 400° C. for 3 minutes and then pressed into sheets at 400° C. for 7 minutes under about 500 kg/cm$^2$. They were separately cooled on a cooling press to room temperature while applying a pressure of about 50 kg/cm$^2$. Cooled sheets thus obtained were annealed at 280° C. for 4 hours in an oven, whereby sheet-like formed products (annealed products) having a thickness of about 0.43 mm were produced.

With respect to the thus-obtained sheet-like formed products, the densities of their PTK portions were measured. In addition, fourteen prepreg sheets of each polymer were laminated. The resultant laminates were separately formed in the same manner, thereby producing formed products of about 3 mm thick. The flexural srength, flexural modulus, Izod impact strength and heat distortion temperature of each of the formed products were measured.

By the way, the density of the PTK portion was determined from the densities of the formed product and the fibrous reinforcing material in accordance with the following equation where the formed product was formed of the PTK and fibrous reinforcing material. Where the formed product was formed of a thermoplastic resin and a filler in addition to the PTK and fibrous reinforcing material, a sample was prepared additionally without the PTK alone and the density of the PTK portion was determined from the density of the sample and that of the formed product in accordance with the following equation.

$$\text{Density of formed product} = \frac{1}{\dfrac{\text{Weight fraction of PTK portions}}{\text{Density of PTK portions}} + \dfrac{1 - (\text{Weight fraction of PTK portions})}{\text{Density of sample without PTK only (or fibrous reinforcing material)}}}$$

Results are shown collectively in Table 3.

It has been understood from Table 3 that the products formed using the melt-stable PTKs (Polymer 1, Polymer 2 and Polymer 3) as matrix materials had a higher density at the PTK portions and higher flexural strength, Izod impact strength and heat distortion temperature compared to the formed produced making use of the conventional PTKs (Polymer A, B and BX) as matrix materials.

TABLE 3

| Experiment code | Powder 1 | Powder 2 | Powder 3 | Powder 4 | Powder 5 | Powder 6 | Powder 7 | Powder 8 |
|---|---|---|---|---|---|---|---|---|
| Glass fiber content (wt. %) | 40 | 42 | 40 | 42 | 41 | 40 | 41 | 43 |
| Matrix polymer | Polymer 1 (PTK) | Polymer 2 (PTK) | Polymer 3 (PTK) | Polymer-A (PTK) | Polymer B (PTK) | Polymer-BX (PTK) | Polymer 1 (90 wt. %) FORTRON[2] (10 wt. %) | Polymer-2 (65 wt. %) FORTRON[2] (35 wt. %) |
| Density of PTK portions (g/cm$^3$)[1] | 1.35 | 1.35 | 1.35 | 1.30 | 1.26 | 1.25 | 1.35 | 1.35 |
| Flexural strength (kg/mm$^2$) (ASTM D-790) | 18 | 20 | 19 | 8 | 9 | 11 | 17 | 18 |
| Flexural modulus (kg/mm$^2$) (ASTM D-790) | 1.6 × 10$^3$ | 1.6 × 10$^3$ | 1.5 × 10$^3$ | 1.3 × 10$^3$ | 1.4 × 10$^3$ | 1.3 × 10$^3$ | 1.5 × 10$^3$ | 1.5 × 10$^3$ |
| Izod impact strength (notched) (kg · cm/cm) (ASTM D-256) | 57 | 61 | 60 | 37 | 25 | 27 | 54 | 56 |
| Heat distortion temperature (264 psi) (°C.) (ASTM D-648) | 350 | 350 | 348 | 343 | 318 | 315 | 342 | 303 |
| Remarks | Example | Example | Example | Conventional PTK Comp. Ex. | Conventional PTK Comp. Ex. | Conventional PTK, cured Comp. Ex. | Example | Example |

[1]Calculation was made assuming the density of glass fibers be 2.54 g/cm$^3$.
[2]Poly(p-phenylene thioether).

EXAMPLE 2

Polymers 1, 2, A and BX were individually added with 0.5 wt. % of fine calcium hydroxide powder, followed by blending in a tumbler blender Each blend was charged into an extruder having a cylinder diameter of 19 mm and equipped with a wire-covering cross die. By feeding a carbon fiber roving ("Torayca" Yarn T300, trade name; product of TORAY INDUSTRIES, INC.) from one side of the cross die and then taking up the roving while coating the roving with the molten polymer inside the closs die, a cord-like prepreg impregnated with about 40 wt. % of the polymer was produced.

However, Polymers A and BX according to the prior art immediately underwent crosslinking or a decomposition reaction within the extruder upon coating, and their melt viscosities jumped up so much that the extrusion encountered difficulties. The extrusion was therefore stopped. It was hence unable to obtain normal prepregs.

Normal prepregs were obtained from Polymer 1 and Polymer 2 which were both melt-stable.

The cord-like prepreg obtained from each of Polymer 1 and Polymer 2 by the melt coating method was chopped. A number of strands thus chopped was oriented in the same direction and placed between frame plates. On a hot press, they were preheated at 390° C. for 1 hour and then pressed at 390° C. for 2 minutes under about 300 kg/cm² into a sheet-like prepreg having a thickness of 0.3 mm.

The resultant sheet-like prepreg was placed between frame plates and on a hot press, was heated at 400° C. for 3 minutes and then pressed at 400° C. for 7 minutes under about 500 kg/cm² into a sheet-like form. It was thereafter quenched to room temperature on a cooling press. The thus-cooled sheet was annealed at 280° C. for 4 hours in an oven, thereby obtaining a sheet-like formed product (annealed product). The density of PTK portions of the resultant sheet-like formed product is given in Table 4. A formed product of about 3 mm was produced likewise, and its flexural strength, flexural modulus, Izod impact strength and heat distortion temperature were measured. Results are summarized in Table 4.

TABLE 4

| Experiment code | Melt 1 | Melt 2 |
| --- | --- | --- |
| Carbon fiber content (wt. %) | 61 | 62 |
| Matrix polymer | Polymer 1 (PTK) | Polymer-2 (PTK) |
| Density of PTK portions (g/cm³)[1] | 1.35 | 1.35 |
| Flexural strength (kg/mm²) (ASTM D-790) | 140 | 143 |
| Flexural modulus (kg/mm²) (ASTM D-790) | $1.3 \times 10^4$ | $1.3 \times 10^4$ |
| Izod impact strength (notched) (kg · cm/cm) (ASTM D-256) | 200 | 204 |
| Heat distortion temperature (264 psi) (°C.) (ASTM D-648) | 355 | 353 |

[1] Calculation was made assuming the density of carbon fibers be 1.74 g/cm³.

EXAMPLE 3

Polymers 1, 2, A, B and BX were separately sprayed with a saturated aqueous solution of calcium hydroxide and then dried to coat them with 0.3 wt. % of calcium hydroxide. The thus-obtained polymer powders were separately sandwiched between two "Kapton" (trade mark) films (products of E. I. du Pont de Nemours & Co, Inc.; polyimide films). On a hot press, they were separately preheated at 385° C. for 2 minutes and then pressed at 385° C. for 0.5 minute to form them into a film-like shape and then quenched to produce films (thickness: 40–60 μm).

From Polymers A, B and BX of the prior art, it was however only possible to obtain films which were extremely brittle and contained many defects. It was therefore difficult to use those films in accordance with the film fusion-bonding method. From melt-stable Polymer 1 and Polymer 2, it was possible to obtain films usable in accordance with the film fusion-bonding method.

Four films of each of Polymer 1 and Polymer 2 and three sheets of "Torayca" cloth #6142" (trade name; product of TORAY INDUSTRIES, INC.; carbon fiber cloth) were alternately laminated. The laminate was placed between frame plates, preheated at 400° C. for 3 minutes and then pressed at 400° C. for 7 minutes under about 500 kg/cm², whereby the laminate was formed into a sheet-like product. The thus-formed product was quenched to room temperature under about 50 kg/cm² on a cooling press. The quenched sheet was annealed at 280° C. for 4 hours in an oven, thereby obtaining a sheet-like formed product having a thickness of about 0.43 mm. Densities of PTK portions of the thus-obtained sheet-like formed products are given in Table 5. Further, PTK films and carbon fiber clothes were alternately laminated and a formed product having a thickness of about 3 mm was obtained in a similar manner. Its physical properties were measured. Results are summarized in Table 5.

TABLE 5

| Experiment code | Melt 1 | Melt 2 |
| --- | --- | --- |
| Carbon fiber content (wt. %) | 61 | 62 |
| Matrix polymer | Polymer 1 (PTK) | Polymer-2 (PTK) |
| Density of PTK portions (g/cm³)[1] | 1.35 | 1.35 |
| Flexural strength (kg/mm²) (ASTM D-790) | 70 | 73 |
| Flexural modulus (kg/mm²) (ASTM D-790) | $5.0 \times 10^3$ | $5.1 \times 10^3$ |
| Izod impact strength (notched) (kg · cm/cm) (ASTM D-256) | 75 | 78 |
| Heat distortion temperature (264 psi) (°C.) (ASTM D-648) | 355 | 353 |

[1] Calculation was made assuming the density of carbon fibers be 1.74 g/cm³.

EXAMPLE 4

Polymers 2, 3, A, and BX were separately sprayed with a saturated aqueous solution of calcium hydroxide and then dried to coat them with 0.3 wt. % of calcium hydroxide. They were separately charged into a single-screw extruder having a cylinder diameter of 19 mm and a length-to-diameter ratio (L/D) ratio of 25, molten and kneaded at 375° C., extruded into strands and then chopped into pellets.

Polymers A and BX according to the prior art were crosslinked or decomposed in course of their extrusion so that it was difficult to proceed with the extrusion further. Even portions whose extrusion was barely succeeded had been crosslinked or decomposed, whereby they were not usable for spinning.

Pellets obtained each of Polymer 2 and Polymer 3 respectively were separately ground into coarse particles having a particle size of 0.3–1 mm, charged into a melt-spinning testing machine equipped with a nozzle defining 18 fine holes of 0.5 mm in diameter (manufactured by Fuji Filter Manufacturing Co., Ltd.) ($R_1$) of about 85 times, thereby obtaining unstretched sakusho K. K.), they were stretched threefold at 155° C. and then thermally set at 280° C. under tension to obtain multifilaments having a diameter of 27 μm.

Twenty multifilaments thus obtained (360 unit filaments), 20 glass fibers ("#ECG150-1/0 1Z", trade name; product of NITTO BOSEKI CO., LTD.) and one Aramid fiber ("Technora Filament Yarn #T-240", trade name; 200 denier; product of Teijin, Ltd.) were taken up in combination, thereby doubling them into rovings.

The thus-obtained rovings were plain-woven as warp yarns and weft yarns respectively, whereby mix-woven prepregs were produced. Four of the prepregs were superposed, placed between frame plates, and on a hot plate, preheated at 400° C. for 3 minutes and then pressed at 400° C. for 7 minutes under about 500 kg/cm², so that they were formed into a sheet-like product. The sheet-like product was then quenched to room temperature on a cooling press while applying a pressure of about 50 kg/cm².

Sheet obtained as described above were annealed at 280° C. for 4 hours in an oven, thereby obtaining sheet-like formed products (annealed products). Properties of the thus-obtained sheet-like formed products are given in Table 6.

TABLE 6

| Experiment code | Fiber 1 | Fiber 2 |
|---|---|---|
| Fiber content (wt. %) | | |
| Glass fibers | 68 | 68 |
| Aramid fibers | 2 | 2 |
| Matrix polymer | Polymer 2 (PTK) | Polymer 3 (PTK) |
| Density of PTK portions (g/cm³)[1] | 1.35 | 1.35 |
| Flexural strength (kg/mm²) (ASTM D-790) | 67 | 65 |
| Flexural modulus (kg/mm²) (ASTM D-790) | 2480 | 2500 |
| Izod impact strength (notched) (kg · cm/cm) (ASTM D-256) | 123 | 120 |
| Heat distortion temperature (264 psi) (°C.) (ASTM D-648) | 347 | 349 |

[1] Calculation was made assuming the densities of glass fibers and Aramid fibers be 2.54 g/cm and 1.39 g/cm respectively.

We claim:

1. A melt-stable poly(arylene thioether-ketone) prepreg comprising in integral combination:
   (A) 20wt. %-90wt. % of a fibrous reinforcing material selected from the group consisting of long fibers, at least one shaped long fiber body and a combination thereof, said fibers and body being formed of a material selected from the group consisting of inorganic fibers, organic fibers and a combination thereof;
   (B) 10wt. %-80% wt. % of a thermoplastic matrix material composed principally of a melt-stable poly(arylene thioether-ketone) having predominant recurring units of the formula

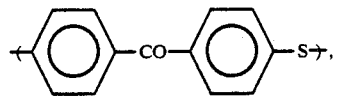

wherein the —CO— and —S— are in the para position to each other, and having the following physical properties (a)-(c):
   (a) melting point, Tm being 310° C.-380° C.;
   (b) melt crystallization temperature, Tmc (420° C./10 min) being at least 210° C. and residual melt crystallization enthalpy, ΔHmc (420° C./10 min) being at least 10 J/g, wherein Tmc (420° C./10 min) and ΔHmc (420° C./10 min) are determined by a differential scanning calorimeter at a cooling rate of 10° C./min after the poly(arylene thioether-ketone) is held at 50° C. for 5 minutes in an inert gas atmosphere, heated to 420° C. at a range of 75° C./min and then held for 10 minutes at 420° C.; and
   (c) reduced viscosity being 0.2-2 dl/g as determined by viscosity measurement at 25° C. and a polymer concentration of 0.5 g/dl in 98 percent by weight sulfuric acid.

2. The prepreg as claimed in claim 1, wherein the inorganic fibers and organic fibers are at least one kind of fibers selected from a group consisting of glass fibers, carbon fibers and Aramid fibers.

3. The prepreg as claimed in claim 1, wherein the poly(arylene thioether-ketone) has a density of at least 1.34 g/cm³ at 25° C. when annealed at 280° C. for 30 minutes.

4. The prepreg as claimed in claim 1, wherein the thermoplastic matrix material is in the form of a powder, and bonding has been established between the fibrous reinforcing material and thermoplastic matrix material by spreading the powder over the fibrous reinforcing material and impregnating the latter with the former.

5. The prepreg as claimed in claim 1, wherein the thermoplastic matrix material is in the form of a powder, and bonding has been established between the fibrous reinforcing material and thermoplastic matrix material by spreading over the fibrous reinforcing material a slurry of the powder in a liquid dispersant formed of a solvent selected from the group consisting of an aqueous solvent, an organic solvent and a combination thereof.

6. The prepreg as claimed in claim 1, wherein the thermoplastic matrix material is in the form of a powder, and bonding has been established between the fibrous reinforcing material and thermoplastic matrix material by impregnating the fibrous reinforcing material with the powder and then heating the fibrous reinforcing material together the powder to a temperature of from the melting point of the poly(arylene thioether-ketone) to 450° C. so as to have the thermoplastic matrix material fusion-bonded to the fibrous reinforcing material.

7. The prepreg as claimed in claim 1, wherein the thermoplastic matrix material is in the form of a melt, and bonding has been established between the fibrous reinforcing material and thermoplastic matrix material by coating the fibrous reinforcing material with the melt.

8. The prepreg as claimed in claim 1, wherein the thermoplastic matrix material is in the form of a film, and bonding has been established between the fibrous reinforcing material and thermoplastic matrix material by laminating the film with the fibrous reinforcing material and then heating the fibrous reinforcing material together with the film to a temperature of from the melting point of the poly(arylene thioether-ketone) to 450° C. so as to have the thermoplastic matrix material fusion-bonded to the fibrous reinforcing material.

9. The prepreg as claimed in claim 1, wherein the fibrous reinforcing material is in the form of long fibers having a length of at least 5 inches (127 mm), the thermoplastic matrix material is in the form of long fibers having a diameter of 1-200 μm, and bonding has been established between the fibrous reinforcing material and thermoplastic matrix material by a process selected from the group consisting of doubling spinning, mix-weaving and a combination thereof the fibrous reinforcing material and thermoplastic matrix material.

10. A melt-stable molded or formed product obtained by:

shaping a material selected from the group consisting of a prepreg, an arrangement of prepregs, and a laminate of prepregs at 140° C.–450° C. under stresses after preheating the material at 140° C.–450° C. each of said prepreg and prepregs comprising in integral combination:
(A) 20wt. %–90wt. % of a fibrous reinforcing material selected from the group consisting of long fibers, at least one shaped long fibber body and a combination thereof, said fibers and body being formed of a material selected from the group consisting of inorganic fibers, organic fibers and a combination thereof;
(B) 10%–80% wt. % of a thermoplastic matrix material composed principally of a melt-stable poly(arylene thioether-ketone) having predominant recurring units of the formula

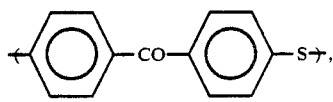

wherein the —CO— and —S— are in the para position to each other, and having the following physical properties (a)–(c):
(a) melting point, Tm being 310° C.–380° C.;
(b) melt crystallization temperature, Tmc (420° C./10 min) being at least 210° C. and residual melt crystallization enthalpy, ΔHmc (420° C./10 min) and ΔHmc (420° C./10 min) are determined by a differential scanning calorimeter at a cooling rate of 10° C./min after the poly(arylene thioether-ketone) is held at 50° C. for 5 minutes in an inert gas atmosphere, heated to 420° C. at a range of 75° C./min and then held for 10 minutes at 420° C.; and
(c) reduced viscosity being 0.2–2 dl/g as determined by viscosity measurement at 25° C. and a polymer concentration of 0.5 g/dl in 98 percent by weight sulfuric acid; and
cooling the thus-shaped product into the molded or formed product.

11. The molded or formed product as claimed in claim 10, wherein the inorganic fibers and organic fibers are at least one kind of fibers selected from a group consisting of glass fibers, carbon fibers and Aramid fibers.

12. The molded or formed product as claimed in claim 10, wherein the poly(arylene thioether-ketone) has a density of at least 1.34 g/cm³ at 25° C. when annealed at 280° C. for 30 minutes.

13. The prepreg as claimed in claim 1, wherein the thermoplastic matrix material is in the form of a powder, and bonding has been established between the fibrous reinforcing material and thermoplastic matrix material by immersing the fibrous reinforcing material a slurry of the powder in a liquid dispersant formed of a solvent selected from the group consisting of an aqueous solvent, an organic solvent and a combination thereof and impregnating the former with the latter.

14. The prepreg as claimed in claim 1, wherein the fibrous reinforcing material is in the form of long fibers having a length of at least 5 inches (127 mm), the thermoplastic matrix material is in the form of long fibers having a diameter of 1–200 μm, and bonding has been established between the fibrous reinforcing material and thermoplastic matrix material by a process selected from the group consisting of doubling (mix-spinning), mix-weaving and a combination thereof the fibrous reinforcing material and thermoplastic matrix material and then heating the resulting product to a temperature of from the melting point of the poly(arylene thioether-ketone) to 450° C. so as to have the thermoplastic matrix material fusion-bonded to the fibrous reinforcing material.

15. A melt-stable molded or formed product obtained by:
shaping a material selected from the group consisting of a prepreg, an arrangement of prepregs, and a laminate of prepregs at 140° C.–450° C. under stresses after preheating the material at 140° C.–450° C. each of said prepreg and prepregs comprising in integral combination:
(A) 20wt. %–90wt. % of a fibrous reinforcing material selected from the group consisting of long fibers, at least one shaped long fiber body and a combination thereof, said fibers and body being formed of a material selected from the group consisting of inorganic fibers, organic fibers and a combination thereof;
(B) 10%–80% wt. % of a thermoplastic matrix material composed principally of a melt-stable poly(arylene thioether-ketone) having predominant recurring units of the formula

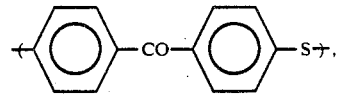

wherein the —CO— and —S— are in the para position to each other, and having the following physical properties (a)–(c):
(a) melting point, Tm being 310° C.–380° C.;
(b) melt crystallization temperature, Tmc (420° C./10 min) being at least 210° C. and residual melt crystallization enthalpy, ΔHmc (420° C./10 min) and ΔHmc (420° C./10 min) are determined by a differential scanning calorimeter at a cooling rate of 10° C./min after the poly(arylene thioether-ketone) is held at 50° C. for 5 minutes in an inert gas atmosphere, heated to 420° C. at a range of 75° C./min and then held for 10 minutes at 420° C.; and
(c) reduced viscosity being 0.2–2 dl/g as determined by viscosity measurement at 25° C. and a polymer concentration of 0.5 g/dl in 98 percent by weight sulfuric acid; and
cooling the thus-shaped product into the molded or formed product;
reheating the thus-shaped product for 0.1–50 hours within a temperature range of from 140° C. to the melting point of the poly(arylene thioether-ketone).

16. A melt-stable molded or formed product obtained by:
shaping a material selected from the group consisting of a prepreg, an arrangement of prepregs, and a laminate of prepregs at 140° C.–450° C. under stresses, after preheating, each of said prepreg and prepregs comprising in integral combination:
(A) 20wt. %–90wt. % of a fibrous reinforcing material selected from the group consisting of long fibers, at least one shaped long fiber body and a combination thereof, said fibers and body being formed of a material selected from the group consisting of inorganic fibers, organic fibers and a combination thereof;

(B) 10%-80% wt. % of a thermoplastic matrix material composed principally of a melt-stable poly(arylene thioether-ketone) having predominant recurring units of the formula

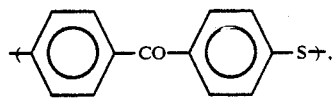

wherein the —CO— and —S— are in the para position to each other, and having the following physical properties (a)-(c):

(a) melting point, Tm being 310° C.-380° C.;

(b) melt crystallization temperature, Tmc (420° C./10 min) being at least 210° C. and residual melt crystallization enthalpy, ΔHmc (420° C./10 min) and ΔHmc (420° C./10 min) are determined by a differential scanning calorimeter at a cooling rate of 10° C./min after the poly(arylene thioether-ketone) is held at 50° C. for 5 minutes in an inert gas atmosphere, heated to 420° C. at a range of 75° C./min and then held for 10 minutes at 420° C.; and (c) reduced viscosity being 0.2-2 dl/g as determined by viscosity measurement at 25° C. and a polymer concentration of 0.5 g/dl in 98 percent by weight sulfuric acid; and cooling the thus-shaped product into the molded or formed product.

17. A melt-stable molded or formed product obtained by:

shaping a material selected from the group consisting of a prepreg, an arrangement of prepregs, and a laminate of prepregs at 140° C.-450° C. under stresses after preheating the material at 140° C.-450° C. each of said prepreg and prepregs comprising in integral combination:

(A) 20wt. %-90wt. % of a fibrous reinforcing material selected from the group consisting of long fibers, at least one shaped long fiber body and a body being formed of a material selected from the group consisting of inorganic fibers, organic fibers and a combination thereof;

(B) 10%-80% wt. % of a thermoplastic matrix material composed principally of a melt-stable poly(arylene thioether-ketone) having predominant recurring units of the formula

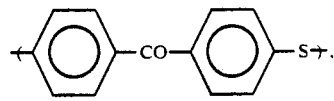

wherein the —CO— and —S— are in the para position to each other, and having the following physical properties (a)-(c):

(a) melting point, Tm being 310° C.-380° C.;

(b) melt crystallization temperature, Tmc (420° C./10 min) being at least 210° C. and residual melt crystallization enthalpy, ΔHmc (420° C./10 min) and ΔHmc (420° C./10 min) are determined by a differential scanning calorimeter at a cooling rate of 10° C./min after the poly(arylene thioether-ketone) is held at 50° C. for 5 minutes in an inert gas atmosphere, heated to 420° C. at a range of 75° C./min and then held for 10 minutes at 420° C.; and (c) reduced viscosity being 0.2-2 dl/g as determined by viscosity measurement at 25° C. and a polymer concentration of 0.5 g/dl in 98 percent by weight sulfuric acid; and cooling the thus-shaped product into the molded or formed product; and reheating the thus-shaped product for 0.1-50 hours within a temperature range of from 140° C. to the melting point of the poly(arylene thioether-ketone).

18. The molded or formed product as claimed in claim 15, wherein the inorganic fibers and organic fibers are at least one kind of fibers selected from a group consisting of glass fibers, carbon fibers and aramid fibers.

19. The molded or formed product as claimed in claim 15, wherein the poly(arylene thioether-ketone) has a density of at least 1.34 g/cm³ at 25° C. when annealed at 280° C. for 30 minutes.

20. The molded or formed product as claimed in claim 16, wherein the inorganic fibers and organic fibers are at least one kind of fibers selected from a group consisting of glass fibers, carbon fibers and aramid fibers.

21. The molded or formed product as claimed in claim 16, wherein the poly(arylene thioether-ketone) has a density of at least 1.34 g/cm³ at 25° C. when annealed at 280° C. for 30 minutes.

22. The molded or formed product as claimed in claim 17, wherein the inorganic fibers and organic fibers are at least one kind of fibers selected from a group consisting of glass fibers, carbon fibers and aramid fibers.

23. The molded or formed product as claimed in claim 17, wherein the poly(arylene thioether-ketone) has a density of at least 1.34 g/cm³ at 25° C. when annealed at 280° C. for 30 minutes.

* * * * *